(12) United States Patent
Lee et al.

(10) Patent No.: US 9,131,258 B2
(45) Date of Patent: Sep. 8, 2015

(54) METHOD AND SYSTEM FOR PROVIDING PERSONALIZED SERVICE IN IPTV

(75) Inventors: Kyu-Yun Lee, Seoul (KR); Sang-Hyun Shin, Yongin-si (KR); Jong-Ho Park, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 13/398,396

(22) Filed: Feb. 16, 2012

(65) Prior Publication Data

US 2012/0210364 A1 Aug. 16, 2012

(30) Foreign Application Priority Data

Feb. 16, 2011 (KR) .................. 10-2011-0013591

(51) Int. Cl.
| | |
|---|---|
| G06F 3/00 | (2006.01) |
| G06F 13/00 | (2006.01) |
| H04N 5/445 | (2011.01) |
| H04N 21/2668 | (2011.01) |
| H04N 21/41 | (2011.01) |
| H04N 21/442 | (2011.01) |
| H04N 21/472 | (2011.01) |
| H04N 21/4788 | (2011.01) |
| H04N 21/482 | (2011.01) |
| H04N 21/643 | (2011.01) |

(52) U.S. Cl.
CPC ....... *H04N 21/2668* (2013.01); *H04N 21/4126* (2013.01); *H04N 21/44222* (2013.01); *H04N 21/4788* (2013.01); *H04N 21/47202* (2013.01); *H04N 21/482* (2013.01); *H04N 21/643* (2013.01)

(58) Field of Classification Search
USPC .......... 725/51, 74, 80, 85, 109, 133, 141, 151
See application file for complete search history.

(56) References Cited

U.S. PATENT DOCUMENTS

| | | | |
|---|---|---|---|
| 2008/0022322 A1* | 1/2008 | Grannan et al. | 725/78 |
| 2008/0141313 A1* | 6/2008 | Kato et al. | 725/62 |
| 2008/0168514 A1* | 7/2008 | Jeon | 725/110 |
| 2009/0061769 A1 | 3/2009 | Zimbric et al. | |
| 2009/0100474 A1* | 4/2009 | Migos | 725/61 |
| 2010/0064228 A1* | 3/2010 | Tsern | 715/740 |
| 2010/0094799 A1* | 4/2010 | Ohashi et al. | 706/54 |
| 2011/0055565 A1* | 3/2011 | Murakami et al. | 713/168 |

FOREIGN PATENT DOCUMENTS

| | | |
|---|---|---|
| KR | 20080066384 | 7/2008 |
| KR | 20090096135 | 9/2009 |
| KR | 10-2010-0069474 | 6/2010 |

OTHER PUBLICATIONS

International Search Report dated Sep. 21, 2012 in connection with International Patent Application No. PCT/KR2012/001103, 3 pages.
Written Opinion of International Searching Authority dated Sep. 21, 2012 in connection with International Patent Application No. PCT/KR2012/001103, 4 pages.
Koo, et al; "R-URC: Smartphone based RF4CE Universal Remote Control Framework" DMC R&D Center, Samsung Electronics; Feb. 6, 2010; 6 pages.

* cited by examiner

*Primary Examiner* — Yassin Alata (57) ABSTRACT

A method for providing a personalized service in an Internet Protocol Television (IPTV) includes pairing a mobile terminal with the IPTV. The method also includes receiving personalized data from the paired mobile terminal, and searching the Internet for contents satisfying the received personalized data and providing the searched contents.

20 Claims, 7 Drawing Sheets

| APPLICATIONS | WEB BROWSING KEYWORDS | CONTENTS | ... |
|---|---|---|---|
| GAME<br>ENTERTAINMENT<br>HEALTH &<br>FITNESS<br>NEWS<br>LIFESTYLE<br>TRAVEL<br>SPORTS<br>... | MOVIES<br>CHARACTERS<br>IMAGES<br>MUSIC<br>BOOKS<br>... | CARS<br>GAME<br>NEWS<br>CHARACTERS<br>MOVIES<br>... | |

METHOD AND SYSTEM FOR PROVIDING PERSONALIZED SERVICE IN IPTV

CROSS-REFERENCE TO RELATED APPLICATION(S) AND CLAIM OF PRIORITY

The present application is related to and claims priority under 35 U.S.C. §119 to an application filed in the Korean Intellectual Property Office on Feb. 16, 2011 and assigned Serial No. 10-2011-0013591, the contents of which are incorporated herein by reference.

TECHNICAL FIELD OF THE INVENTION

The present invention relates generally to a method and system for providing a personalized service in an Internet Protocol Television (IPTV) on a user-by-user basis, and in particular, to a method and system for providing a personalized service for each of the network-connected terminals by an IPTV.

BACKGROUND OF THE INVENTION

Due to the development of electronic communication industries, electronic devices, such as mobile phones, personal digital assistants (PDAs) and digital TVs, are becoming necessities in modern society and are becoming an important means for information transmission that is rapidly changing. As is well known in the art, such electronic devices are evolving into intelligent devices having computer-supported functions such as Internet communication and information search. Such intelligent electronic devices are widely used even in general homes. Recently, such electronic devices (e.g., smart phones and IPTVs) are connected in a wired or wireless manner to implement a home network. In particular, such intelligent electronic devices are personalized according to user characteristics, and network environments between devices are also personalized according to user characteristics. For example, smart phones provide mainly Internet services based on personal information.

Figure 1:
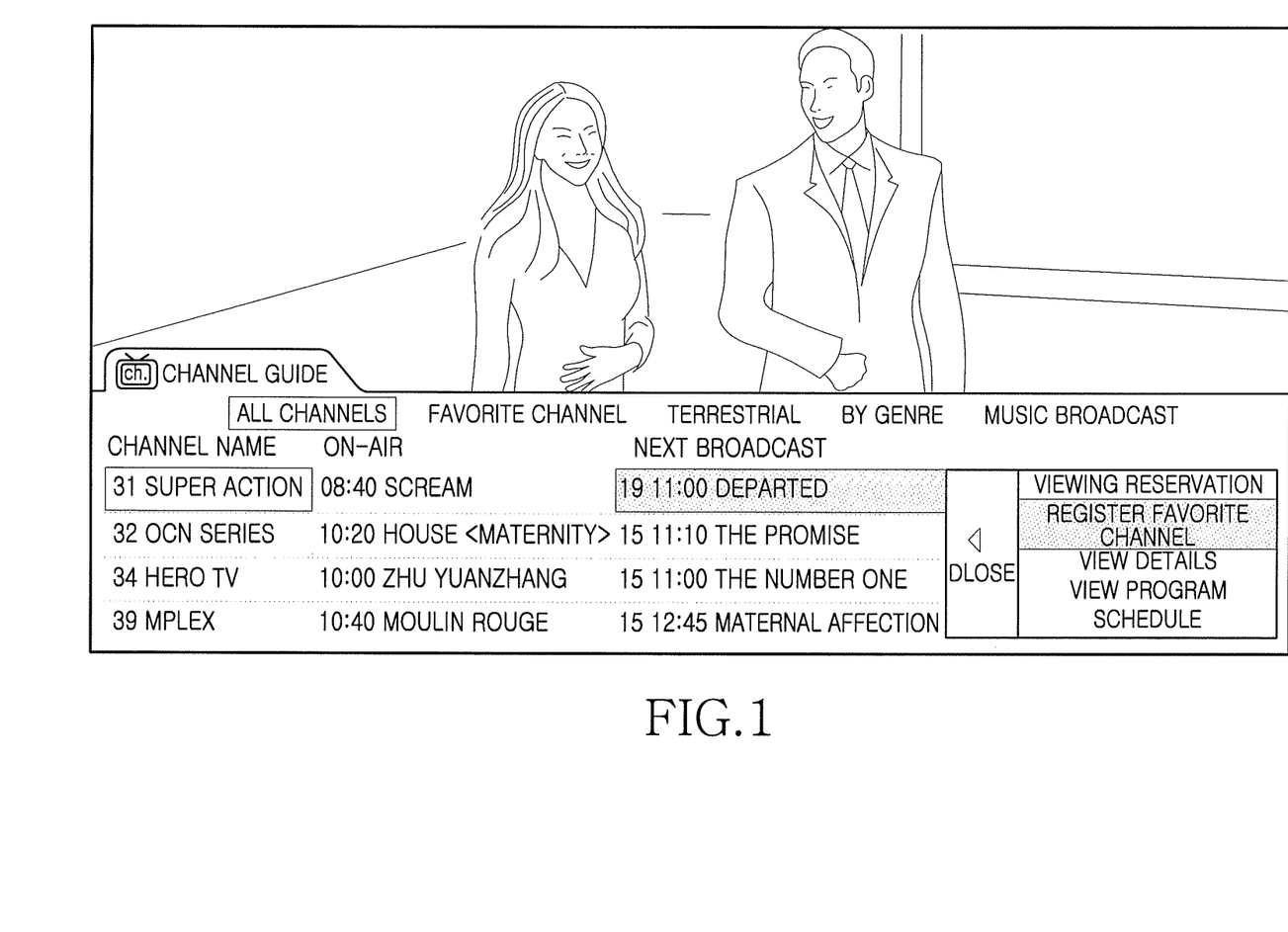
FIG. 1 illustrates a user interface provided by a conventional IPTV.

FIG. 1 illustrates a user interface provided by a conventional IPTV. As shown in FIG. 1, a user can perform a desired function (e.g., channel search, viewing, viewing reservation, and favorite channel registration) by selecting a menu provided by the user interface. For example, the user can register a current channel or a channel, selected from the list of channels searched, as a favorite channel. The user can select a favorite channel from the list of favorite channels registered, and can delete a favorite channel from the favorite channel list. According to this conventional favorite channel registering method, the user is troubled by having to manually manage a favorite channel list, and a favorite channel list managed by the previous user is meaningless to other users. What is therefore required is a scheme for overcoming the above disadvantages in the circumstance where a personalized network environment is established between electronic devices.

SUMMARY OF THE INVENTION

To address the above-discussed deficiencies of the prior art, it is a primary object to provide at least the advantages below. Accordingly, an object of the present invention is to provide a method and system for providing a personalized service by an Internet Protocol Television (IPTV) on a user-by-user basis.

Another object of the present invention is to provide a method and system for providing a personalized service by an IPTV according to personalized data received from a network-connected terminal.

Another object of the present invention is to provide a mobile terminal that can collect and analyze context information, derive personalized data and transmit the personalized data to a connected IPTV, and an IPTV that can search and provide recommended contents or load an interface environment according to the personalized data received from the mobile terminal.

According to an aspect of the present invention, a method for providing a personalized service in an IPTV includes: pairing a mobile terminal with the IPTV; receiving personalized data from the paired mobile terminal; and searching the Internet for contents satisfying the received personalized data and providing the searched contents.

According to another aspect of the present invention, a system that provides a personalized service in an Internet Protocol Television (IPTV) includes: a mobile terminal that can collect context information, derive personalized data from the context information, and transmit the personalized data to the IPTV; and the IPTV that can search the Internet for contents satisfying the personalized data, received from the mobile terminal, and provide the searched contents.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 2 through 7, discussed below, and the various embodiments used to describe the principles of the present disclosure in this patent document are by way of illustration only and should not be construed in any way to limit the scope of the disclosure. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein must be understood based on the descriptions made herein.

The present disclosure relates to a method and system for providing a personalized service in an Internet Protocol Television (IPTV) on a user-by-user basis, and in particular, to a method and system for providing a personalized service for each of the network-connected terminals by an IPTV.

Figure 2:
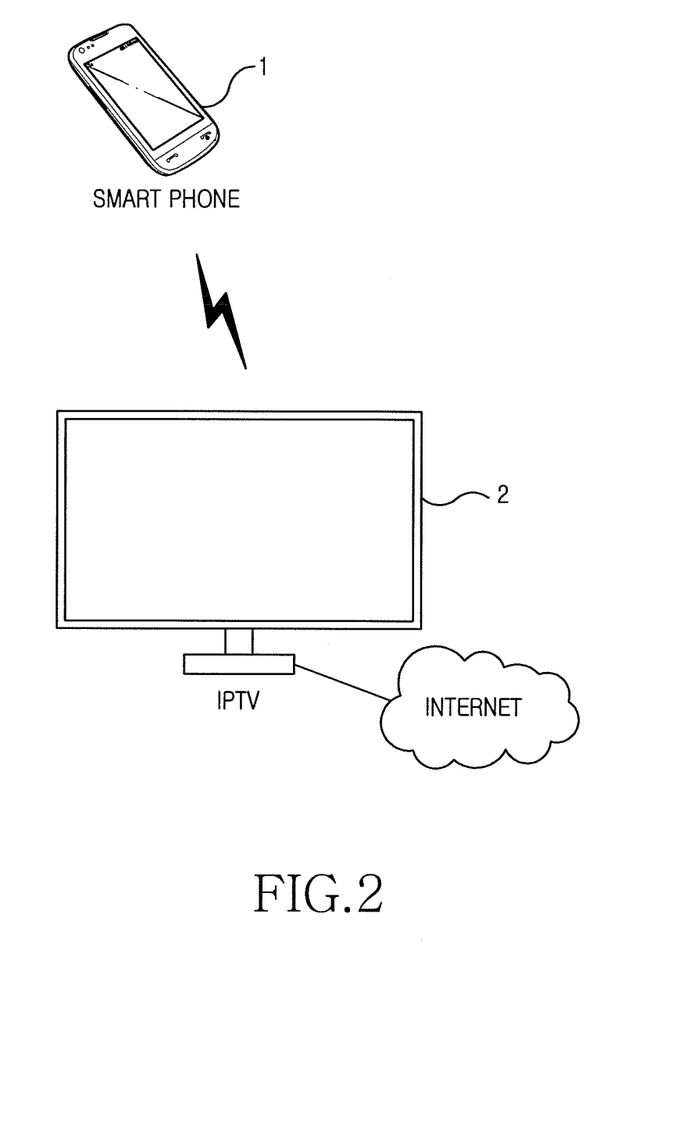
FIG. 2 illustrates a system for providing a personalized service in an IPTV according to an exemplary embodiment of the present disclosure.

FIG. 2 illustrates a system for providing a personalized service in an IPTV according to an exemplary embodiment of the present disclosure. The IPTV can be a TV having an internal IP settop box (STB) embedded therein, or can be a TV having an external IP settop box connected thereto. Through the Internet, the IPTV can receive multimedia contents including video, audio, and packet data, such as broadcast channels, movies and videos on demand (VODs).

Referring to FIG. 2, a smart phone 1 and the IPTV 2 perform wired or wireless communication. For example, the smart phone1 and the IPTV 2 can construct a home network based on DLNA (Digital Living Network Alliance). The DLNA can connect the smart phone and the IPTV through a WiFi network by UPnP (Universal Plug and Play) technology. The smart phone 1 and the IPTV 2 can also use various other network construction technologies. Hereinafter, it is assumed that the smart phone 1 and the IPTV 2 perform near-field wireless communication such as WiFi, Bluetooth® and NFC (Near Field Communication).

In general, a personalized service provides an output (e.g., services and contents) on the basis of an input (e.g., inclinations) provided by a user, and provides personalized results on a user-by-user basis. According to an exemplary embodiment of the present disclosure, the smart phone derives personalized data reflecting context information or use history and transmits the personalized data to the IPTV, and the IPTV searches and provides contents on the basis of the personalized data received from the smart phone.

First, the smart phone and the IPTV are paired to construct a near-field wireless network. The paring is to recognize the presence of devices to be connected together. The IPTV searches for smart phones, capable of near-field communication, automatically by user environment setting, makes a list of the searched smart phone, and displays a user interface for allowing the user to select a pairing target from the smart phone list. The user selects a smart phone from the smart phone list and pairs the selected smart phone with the IPTV.

According to some embodiments, the user can designate a smart phone to be automatically paired with the IPTV in the interface environment, and the designated smart phone can be paired automatically with the IPTV in precedence over other smart phones searched. Even when the IPTV and the smart phone are paired together, the IPTV can again request the user to perform a user authentication process (e.g., an authentication password entering process) for a personalized service according to an exemplary embodiment of the present disclosure. For example, upon receiving a request for a user authentication password of a personalized service, the user can input the authentication password by key buttons of the smart phone.

The user of the paired smart phone can set the interface environment, provided by the IPTV, in its own style. The interface environment settings can include menu bar setting, font size setting, and favorite channel list creation. The interface environment settings can also include display environment settings such as screen brightness setting and resolution setting. The IPTV stores interface environments for the respective smart phones, and loads the interface environment corresponding to the smart phone paired with the IPTV itself. That is, the IPTV according to an exemplary embodiment of the present disclosure provides an interface environment personalized for each smart phone. Hereinafter, it is assumed that the personalized service according to an exemplary embodiment of the present disclosure includes providing an interface environment personalized for each smart phone.

In general, when two devices are paired together, they should exchange addresses or device names with each other. Thus, if the address of the paired smart phone is already registered, the IPTV can request personalized data from the connected smart phone without the above user identification process. Likewise, if the address of the paired IPTV is already registered, the smart phone can transmit personalized data to the IPTV without the user authentication process.

Figure 3:
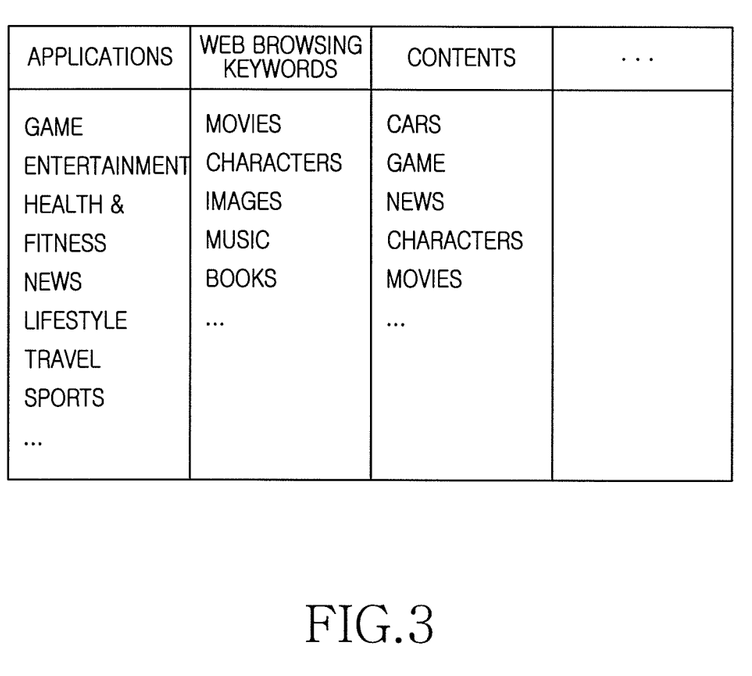
FIG. 3 illustrates a table showing the category-by-category classification of context information collected by a smart phone according to an exemplary embodiment of the present disclosure.

As described above, the paired smart phone can derive personalized data reflecting context information and transmit the personalized data to the IPTV. The context information can include information about application use history, Web browsing keywords, broadcast viewing history, and content use history, which can be data used to predict contents that interest the user (hereinafter referred to as user-interesting contents for short). According to an exemplary embodiment of the present disclosure, the smart phone collects such context information, derives personalized data from the context information, and transmits the personalized data to the connected IPTV. The personalized data can include content search conditions such as interesting fields, content types (e.g., VODs, broadcast channels, and images) and search keywords. FIG. 3 illustrates a table showing the category-by-category classification of context information collected by a smart phone according to an exemplary embodiment of the present disclosure. As shown in FIG. 3, the categories include main categories, such as application programs, Web browsing keywords and contents, and a plurality of subcategories included in the main categories. In future, the category that is high in frequency of use can be selected as a user-interesting field.

In particular, because a user-interesting field can vary, the user can set a context information collection period (e.g., by the day/week/month) to derive personalized data. When new personalized data are derived, the previous personalized data can be deleted.

According to an exemplary embodiment of the present disclosure, the IPTV searches the Internet for contents (e.g., VODs and broadcast channels) with reference to the personalized data received from the paired smart phone, displays a list of the searched contents, and waits for the user to select contents from the displayed list. The searched contents are arranged in descending order of the degree of satisfying the conditions for searching personalized data. Also, the IPTV can automatically play the content that best satisfies the personalized data among the searched contents.

Also, the two paired devices can share data even before the start of a personalized service according to an exemplary embodiment of the present disclosure. For example, two devices connected by Bluetooth communication can share contents such as videos and images. Thus, when receiving a personalized service request from the user, the smart phone can transmit the personalized data to the IPTV.

Figure 4:
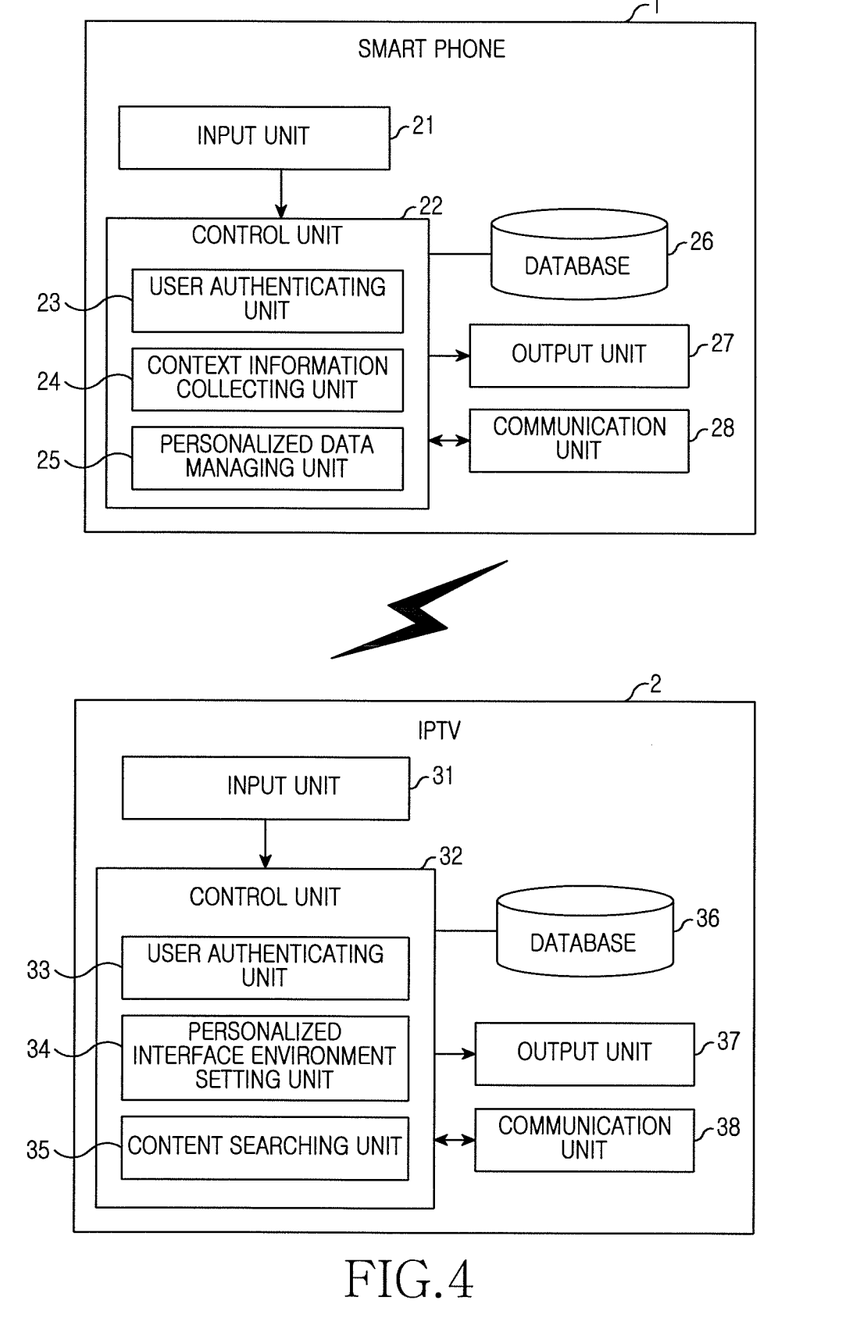
FIG. 4 illustrates a personalized service providing system according to an exemplary embodiment of the present disclosure.

FIG. 4 illustrates a personalized service providing system according to an exemplary embodiment of the present disclosure.

Referring to FIG. 4, the personalized service providing system includes a smart phone and an IPTV. The smart phone collects context information, derives personalized data, and transmits the personalized data to the IPTV. The IPTV provides a personalized service corresponding to the personalized data received from the smart phone.

According to an exemplary embodiment of the present disclosure, the smart phone includes an input unit 21 that receives a user input, a database 26 that stores data, an output unit 27 that outputs the data, stored in the database 26, as audio or video signals, a communication unit 28 that performs communication, and a control unit 22 that controls an overall operation of the smart phone.

In particular, the smart phone can include a user authenticating unit 23 that determines whether the connected IPTV is a partner device for a personalized service, a context information collecting unit 24 that collects context information, and a personalized data managing unit 25 that derives the personalized data, to be transmitted to the IPTV, from the context information collected by the context information collecting unit 24. According to an exemplary embodiment, the control unit 22 can include the user authenticating unit 23, the context information collecting unit 24, and the personalized data managing unit 25. The context information can include information about application use history, Web browsing keywords, broadcast viewing history, and content use history, which can be data used to predict user-interesting contents. The context information collected by the context information collecting unit 24 is stored in the database 26. Also, the context information collecting unit 24 can collect context information by the period (e.g., by the day/week/month) set according to user environment settings. Also, when new context information is collected, the context information collecting unit 24 can store the new context information in the database 26 by replacing the previous context information with the new context information.

The personalized data managing unit 25 derives personalized data from the context information, stored in the database 26, by using an algorithm given relevant conditions (e.g., frequency of use). The personalized data are an input factor for outputting a personalized service from the IPTV, and include conditions for searching recommended contents. The personalized data managing unit 25 stores the derived personalized data in the database 26. Also, when new personalized data are derived, the personalized data managing unit 25 can store the new personalized data in the database 26 by replacing the previous personalized data with the new personalized data. The control unit 22 transmits the personalized data through the communication unit 28 to the IPTV.

According to an exemplary embodiment of the present disclosure, the IPTV includes an input unit 31 that receives a user input and personalized data transmitted from the smart phone, a database 36 that stores data, an output unit 37 that outputs the data, stored in the database 36, as audio or video signals, a communication unit 38 that performs communication, and a control unit 32 that controls an overall operation of the IPTV.

In particular, the IPTV can include a user authenticating unit 33 that determines whether the connected smart phone is a partner device for a personalized service, a personalized interface environment setting unit 34 that loads an interface environment corresponding to an authenticated user (or smart phone) from the database 36, and a content searching unit 35 that searches the Internet for contents satisfying the personalized data when a personalized service is authenticated. According to an exemplary embodiment, the control unit 32 can include the user authenticating unit 33, the personalized interface environment setting unit 34, and the content searching unit 35.

The control unit 32 creates a list of Internet contents searched by the content searching unit 35, and displays a user interface for allowing the user to select desired contents from the content list. Also, the control unit 32 can arrange the searched contents in descending order of the degree of satisfying the searching conditions of personalized data, or can automatically play the content that best satisfies the searching conditions of personalized data among the searched contents.

The personalized interface environment setting unit 34 can set the interface environment, provided by the IPTV, in its own style and store the same in the database 36. That is, the personalized interface environment setting unit 34 can set the interface environment differently for each smart phone.

With reference to the drawings, a description will be given of a method for performing, by the control units 22 and 23, a personalized service in the IPTV according to an exemplary embodiment of the present disclosure.

Figure 5:
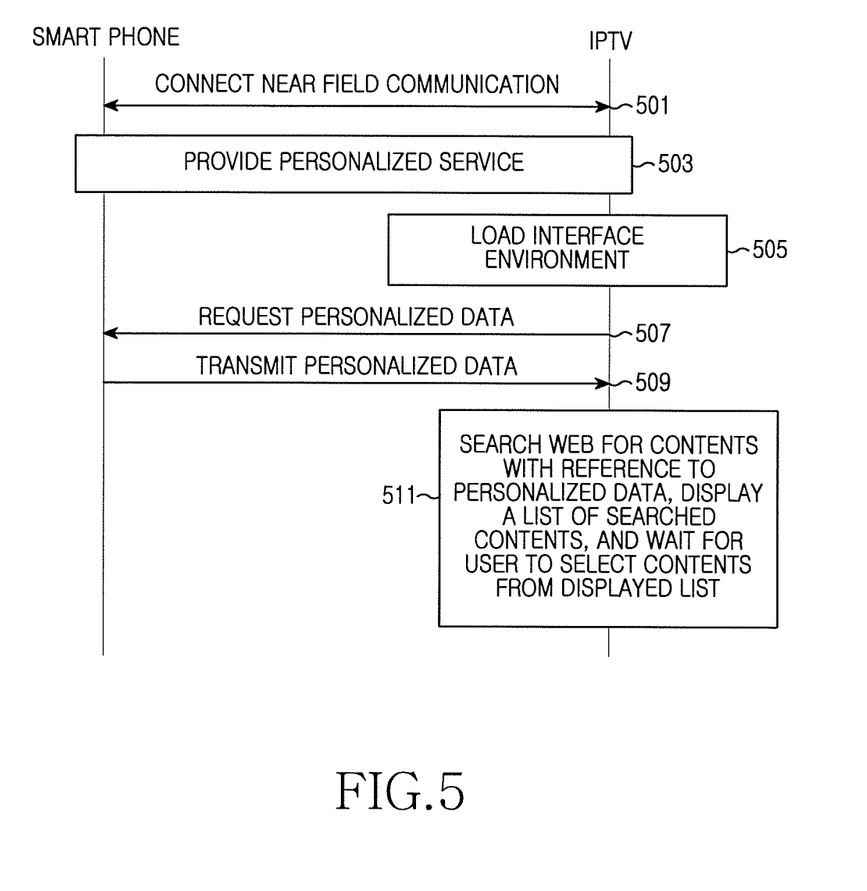
FIG. 5 illustrates a process for communication between an IPTV and a smart phone for a personalized service according to an exemplary embodiment of the present disclosure.

FIG. 5 illustrates a process for communication between an IPTV and a smart phone for a personalized service according to an exemplary embodiment of the present disclosure.

Referring to FIG. 5, the smart phone and the IPTV are paired by NFC (block 501).

If the paired smart phone and IPTV are devices registered to provide a personalized service, the two devices provide a personalized service automatically or at the user's request (block 503). Because the two paired devices exchange addresses or device names, the IPTV or the smart phone can beforehand register the address of the partner device for providing a personalized service.

For the personalized service, the IPTV loads an interface environment corresponding to the connected smart phone (block 505). If there is no interface environment corresponding to the connected smart phone, a basically-provided interface environment or an interface environment provided before pairing can be applied.

Also, the IPTV requests personalized data from the connected smart phone (block 507), and the smart phone transmits personalized data to the connected IPTV (block 509).

The IPTV searches the Web for contents satisfying the personalized data received from the connected smart phone, and waits for the user to select contents from a displayed content list (block 511).

Figure 6:
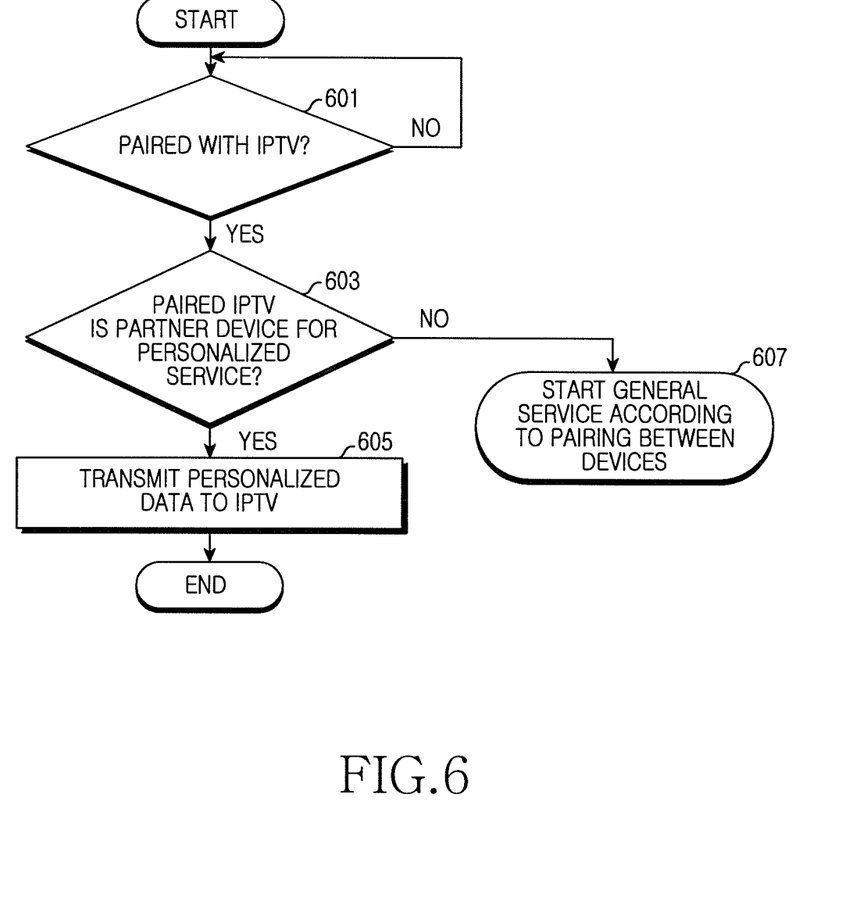
FIG. 6 illustrates a process for transmission of personalized data for a personalized service to a connected IPTV by a smart phone according to an exemplary embodiment of the present disclosure.

FIG. 6 illustrates a process of transmission of personalized data for a personalized service to a connected IPTV by a smart phone according to an exemplary embodiment of the present disclosure.

Referring to FIG. 6, when the smart phone is paired with the IPTV (block 601), the control unit 22 determines whether the paired IPTV is a partner device for a personalized service (block 603). For example, the smart phone beforehand registers the address of the partner device for a personalized service. When the address of the partner device is identical to the registered address, the control unit 22 determines that an authenticated partner device for a personalized service is paired. If the paired IPTV is not a partner device for a personalized service, the control unit 22 starts a general service (e.g., sharing of contents such as pictures and videos) according to pairing between devices (block 607). The personalized service can be requested at the smart phone or the IPTV by the user. When the user requests a personalized service at the IPTV, the IPTV requests personalized data from the paired smart phone. That is, because there is a case where the two devices are paired to share only contents, the personalized service can be selectively requested. However, as described above, if the registered IPTV is paired, the control unit 22 determines the IPTV to be a partner device for a personalized service, and transmits personalized data to the IPTV immediately (block 605).

Figure 7:
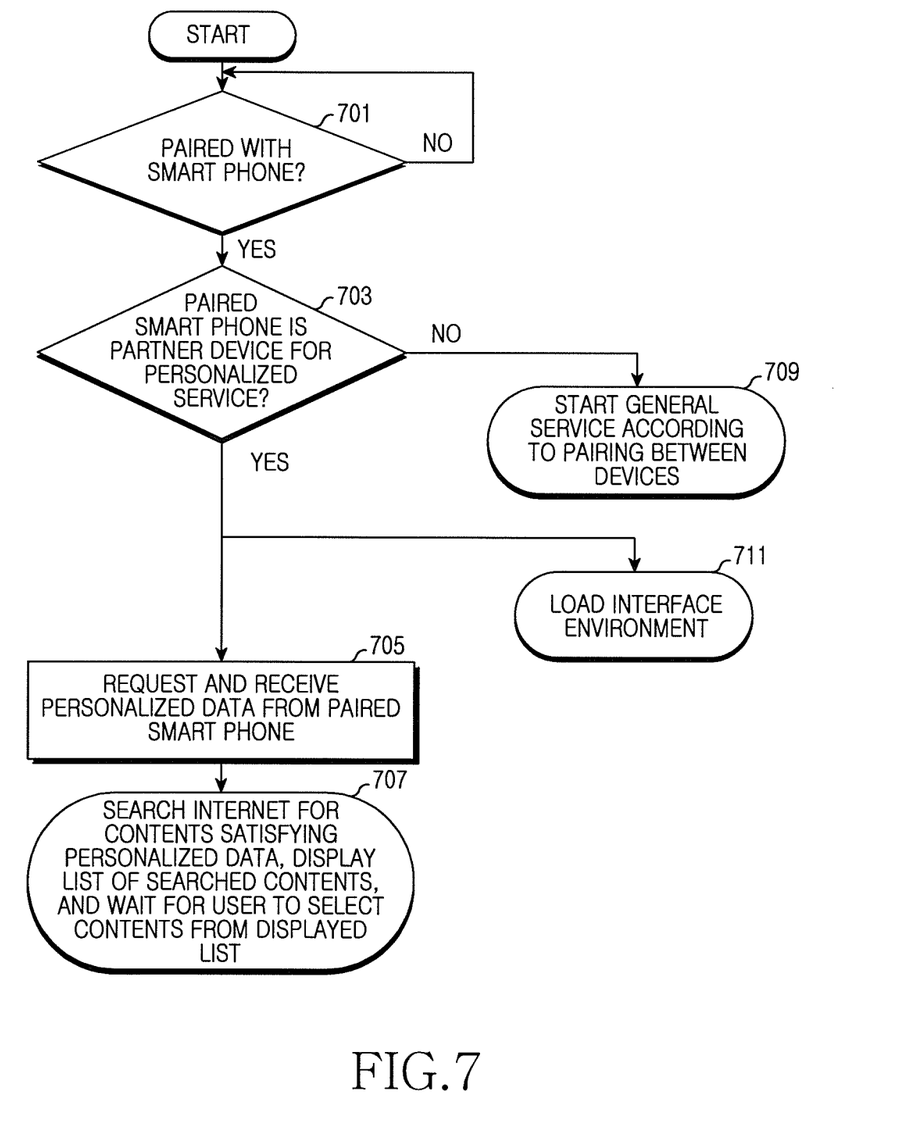
FIG. 7 illustrates a process for performing a personalized service by an IPTV connected to a smart phone according to an exemplary embodiment of the present disclosure.

FIG. 7 illustrates a process of performing a personalized service by an IPTV connected to a smart phone according to an exemplary embodiment of the present disclosure.

Referring to FIG. 7, when the IPTV is paired with the smart phone (block 701), the control unit 32 determines whether the paired smart phone is a partner device for a personalized service (block 703). For example, the IPTV beforehand registers the address of the partner device for a personalized service. When the address of the partner device is identical to the registered address, the control unit 32 determines that an authenticated partner device for a personalized service is paired. If the paired smart phone is not a partner device for a personalized service, the control unit 32 starts a general service (e.g., sharing of contents such as pictures and videos) according to pairing between devices (block 709).

If the paired smart phone is a partner device for a personalized service, the control unit 32 requests and receives personalized data from the paired smart phone (block 705). Thereafter, the control unit 32 searches the Internet for contents satisfying the received personalized data, displays a list of the searched contents, and waits for the user to select contents from the displayed list (block 707). In particular, the control unit 32 can arrange the searched contents in descending order of the degree of satisfying the personalized data, or can automatically play the content that best satisfies the personalized data among the searched contents.

If the paired smart phone is a partner device for a personalized service, the control unit 32 loads an interface environment corresponding to the paired smart phone (block 711).

According to an exemplary embodiment of the present disclosure, the personalized service can further include a server connecting with the IPTV. The server collates (mashes up) the contents searched by a plurality of IPTVs, and lists the contents according to priority. The content having the highest priority among a recommended content list provided by the server can be determined to be the content in which many users are recently interested. Therefore, the IPTV user can access the server to detect the trend of contents in which users are recently interested. Thus, even without using his own smart phone, the IPTV user can access the server to receive a recommended content list searched and collated according to the personalized data of other users. Also, the IPTV accessing the server can use the content list, provided by the server, as a reference list for a personalized service that will be performed later. That is, according to an exemplary embodiment of the present disclosure, the IPTV or the server can collate the content list, searched with reference to the personalized data received from the connected smart phone, and the content list, provided by the server, into one list.

According to another exemplary embodiment, the server can receive personalized data from each smart phone or each IPTV and manage the received personalized data. The server can collate personalized data (exclusive of personal information) received from a plurality of smart phones of IPTVs, search for contents satisfying the collated personalized data, and provide a list of the searched contents. Thus, the IPTV user can access the server to receive a recommended content list. The smart phone and the IPTV can periodically transmit personalized data to the server. For example, the device participating in cloud computing can periodically access the server to provide personalized data. Also, the IPTV participating in the cloud computing can periodically access the server to receive a recommended content list.

As described above, according to the personalized service providing method and system of the present disclosure, the IPTV can provide a user-by-user personalized service by receiving personalized data reflecting use history and personal information from the connected terminal.

While the invention has been shown and described with reference to certain exemplary embodiments thereof, it will be understood by those skilled in the art that various changes in form and details can be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for providing a personalized service in an electronic device, the method comprising:

pairing through short-range wireless communication between a first device and a second device;

determining, at the first device, whether the paired second device is registered for the personalized service;

loading and providing, at the first device, an interface environment corresponding to the second device among a plurality of interface environments stored in the first device;

requesting, at the first device, the personalized service transfer to the second device;

generating, at the second device, personalized data based on a context information collected during a context information collection period and transmitting the personalized data to the first device;

receiving, at the first device, the personalized data from the second device; and searching, at the first device, contents satisfying the received personalized data through the Internet and providing the searched contents, wherein the providing the searched contents comprises at least one of:

providing, arranged in an order according to the personalized data, a content list of the searched contents through a screen, or providing, by automatically playing, a content satisfying the personalized data among the searched contents.

2. The method of claim 1, wherein pairing between the first device and the second device comprises:

searching, by the first device, for connectable second devices;

pairing a predetermined one of the searched second devices with the first device.

3. The method of claim 1, further comprising:
determining, at the first device, whether the paired second device is a partner device for a personalized service; and
requesting, at the first device, the personalized data to the paired second device if the paired second device is a partner device for a personalized service.

4. The method of claim 1, wherein the personalized data includes content search conditions corresponding to at least one of: frequency of uses, interesting fields, content types, or search keywords.

5. The method of claim 1, wherein providing the searched contents comprises displaying the content list of the searched contents and waiting for a user to select contents from the displayed content list.

6. The method of claim 1, wherein providing the searched contents comprises playing the content that best satisfies the personalized data among the searched contents.

7. The method of claim 1, wherein the first device and the second device are paired by a Digital Living Network Alliance (DLNA).

8. The method of claim 1, wherein the first device and the second device are paired by one of: WiFi, Bluetooth or Near Field Communication (NFC).

9. The method of claim of claim 1, further comprising:
deleting a previous personalized data when the personalized data is generated.

10. A system capable of providing a personalized service in an electronic device, the system comprising:
a second device configured to collect context information during a context information collection period, generate personalized data based on the context information, and transmit the personalized data to a first device; and
the first device configured to:
pair through short-range wireless communication with the second device;
determine whether the paired second device is registered for the personalized service;
load and provide an interface environment corresponding to the second device among a plurality of environments stored in the first device;
request the personalized service transfer to the second device;
receive the personalized data from the second device;
search contents satisfying the received personalized data through the Internet and provide the searched contents; and
at least one of:
provide, arranged in an order of according to the personalized data, a content list of the searched contents through a screen, or
provide, by automatically playing, a content satisfying the personalized data among the searched contents.

11. The system of claim 10, wherein the first device and the second device are paired by a Digital Living Network Alliance (DLNA).

12. The system of claim 10, wherein the first device and the second device are paired by one of: WiFi, Bluetooth or Near Field Communication (NFC).

13. The system of claim 10, wherein the first device is configured to request personalized data from the second device if the second device is a partner device for a personalized service.

14. The system of claim 10, wherein the second device is configured to transmit personalized data to the first device if the first device is a partner device for a personalized service.

15. The system of claim 10, wherein the personalized data includes content search conditions corresponding to at least one of: frequency of uses, interesting fields, content types, or search keywords.

16. The system of claim 10, wherein the second device is configured to detect a predetermined collection period for collecting the context information, and collect the context information during the predetermined collection period to derive the personalized data.

17. The system of claim 10, wherein the first device is configured to display the content list of searched contents and wait for a user to select contents from the displayed content list; and play the content that best satisfies the personalized data among the searched contents.

18. The system of claim 10, further comprising a server configured to provide a list of contents searched by each first device.

19. The system of claim 10, further comprising a server configured to receive personalized data from at least one of: a plurality of second devices and a plurality of first devices, wherein the service further is configured to collate the personalized data, search the Internet for contents satisfying the collated personalized data, and provide the searched contents.

20. The system of claim 12, wherein the second device is configured to delete a previous personalized data when the personalized data is generated.

* * * * *